US008078327B2

(12) United States Patent
Lu et al.

(10) Patent No.: US 8,078,327 B2
(45) Date of Patent: Dec. 13, 2011

(54) CONTROL METHOD OF A HYDRAULIC MACHINE FOR SAVING ENERGY OR IMPROVING EFFICIENCY

(75) Inventors: Weiting Lu, Tainan (TW); Hsiaoting Lu, Yongkang (TW)

(73) Assignees: Union Plastic (Hangzhou) Machinery Co., Ltd., Zhejiang (CN); Hsiaoting Lu, Tainan County (TW)

( * ) Notice: Subject to any disclaimer, the term of this patent is extended or adjusted under 35 U.S.C. 154(b) by 491 days.

(21) Appl. No.: 12/295,722

(22) PCT Filed: Apr. 4, 2006

(86) PCT No.: PCT/CN2006/000598
§ 371 (c)(1),
(2), (4) Date: Oct. 1, 2008

(87) PCT Pub. No.: WO2007/112616
PCT Pub. Date: Oct. 11, 2007

(65) Prior Publication Data
US 2009/0306832 A1 Dec. 10, 2009

(51) Int. Cl.
*G06F 19/00* (2006.01)

(52) U.S. Cl. ........................................ 700/282; 425/589

(58) Field of Classification Search .................. 700/282, 700/295; 425/589, 591; 264/40.1; 123/90.12, 123/90.16
See application file for complete search history.

(56) References Cited

U.S. PATENT DOCUMENTS

| | | | | |
|---|---|---|---|---|
| 5,155,966 | A * | 10/1992 | Breidenbach et al. | 52/746.11 |
| 6,823,672 | B2 * | 11/2004 | Nakamura | 60/449 |
| 2003/0003178 | A1 * | 1/2003 | Kami et al. | 425/150 |
| 2003/0042640 | A1 * | 3/2003 | Kubota | 264/40.1 |
| 2003/0090019 | A1 * | 5/2003 | Amano | 264/40.5 |
| 2003/0092640 | A1 * | 5/2003 | Boettner | 514/28 |

* cited by examiner

*Primary Examiner* — Kidest Bahta

(57) ABSTRACT

An energy-saving or speed-increase control method for a hydraulic machine is disclosed in this invention, the characteristics of which includes a control plan to adjust pressure or flow amount of the machine for energy-saving or production efficiency increase; setting up working conditions as in input to said machine; inspection of working conditions and operational processes of the machine; updating demands in control plan based on the inspected working conditions and operational processes of a hydraulic machine; incorporating specific characteristics of individual elements in different working conditions and operational processes to coordinate with the control plan.

7 Claims, 12 Drawing Sheets

| Operational procedures | ① slow mold-closing | ② fast mold-closing | ③ low pressure mold-closing | ④ high pressure mold-closing | ⑤ molding-closing done | ⑥ seating-in | ⑦ ejection I | ⑧ ejection II | ⑨ ejection III | ⑩ ejection IV | ⑪ pressure reserved I |
|---|---|---|---|---|---|---|---|---|---|---|---|
| manually preset pressure | 30Kg | 50Kg | 10Kg | 100Kg | 0Kg | 30Kg | 140Kg | 100Kg | 140Kg | 80Kg | 80Kg |
| manually preset flow amount | 30L | 78L | 30L | 30L | 0 | 30L | 100L | 120L | 100L | 80L | 40L |
| flow amount at lowest motor rotation speed 400 RPM | 26L | → | → | → | → | → | → | → | → | → | → |
| flow amount at highest motor rotation speed 1800 RPM | 117L | → | → | → | → | → | → | → | → | → | → |
| flow amout at lowest oil pump rotation speed 600 RPM | 39L | → | → | → | → | → | → | → | → | → | → |
| flow amount at 1800 RPM by pressure flow amount | 117L | → | → | → | → | → | → | → | → | → | → |
| power of motor by pressure and flow amount | 1.94KW | 6.47KW | 0.65KW | 6.47KW | lowest pressure | 1.94KW | 20.18KW | 19.4KW | 20.18KW | 10.6KW | 5.3KW |
| Shall output power of frequency converter increase ? | NO | → | → | → | → | → | Yes 240V | Yes 231V | Yes 240V | No | → |
| actual output flow | 39L | 78L | 39L | 39L | 39L | 39L | 85L | 117L | 100L | 80L | 40L |
| Shall flow ratio be used in saving for flow needed | Yes | (NO) Yes or No | Yes | Yes | Yes | Yes | (NO) Yes or No | (NO) Yes or No | (NO) Yes or No | (NO) Yes or No | (NO) Yes or No |
| maximum alternate currents from frequency converter | 240V | → | → | → | → | → | → | → | → | → | → |
| actual output pressure | 30Kg | 50Kg | 10Kg | 100Kg | 0Kg | 30Kg | 140Kg | 100Kg | 121.7Kg | 80Kg | 80Kg |

| Operational procedures | ⑫ pressure reserved II | ⑬ cooling | ⑭ churning material | ⑮ slow mold-opening | ⑯ fast mold-opening | ⑰ slow mold opening | ⑱ mold-opening done | ⑲ mold-holding in | ⑳ mold-holding out | ㉑ mold-holding done |
|---|---|---|---|---|---|---|---|---|---|---|
| manually preset pressure | 30Kg | 0 | 80Kg | 80Kg | 50Kg | 30Kg | 0 | 80Kg | 30Kg | 0 |
| manually preset flow amount | 20L | 0 | 60L | 30L | 70L | 30L | 0 | 30L | 70L | 0 |
| flow amount at lowest motor rotation speed 400 RPM | → | → | → | → | → | → | → | → | → | → |
| flow amount at highest motor rotation speed 1800 RPM | → | → | → | → | → | → | → | → | → | → |
| flow amout at lowest oil pump rotation speed 600 RPM | → | → | → | → | → | → | → | → | → | → |
| flow amount at 1800 RPM by pressure flow amount | → | → | → | → | → | → | → | → | → | → |
| power of motor by pressure and flow amount | 1.94KW | lowest pressure | 8KW | 4KW | 5.8KW | 2KW | lowest pressure | 5.2KW | 3.5KW | lowest pressure |
| Shall output power of frequency converter increase ? | → | → | → | → | → | → | → | → | → | → |
| actual output flow | 39L | 39L | 60L | 39L | 70L | 39L | 39L | 39L | 70L | 39L |
| Shall flow ratio be used in saving for flow needed | Yes | Yes | (NO) Yes or No | Yes | (NO) Yes or No | Yes | Yes | Yes | (NO) Yes or No | Yes |
| maximum alternate currents from frequency converter | → | → | → | → | → | → | → | → | → | → |
| actual output pressure | 30Kg | 0Kg | 80Kg | 80Kg | 50Kg | 30Kg | 0Kg | 80Kg | 30Kg | 0Kg |

Fig. 4

| Operational procedures | 1 slow mold-closing | 2 fast mold-closing | 3 low pressure mold-closing | 4 high pressure mold-closing | 5 molding-closing done | 6 material cut-in | 7 shifting-down | 8 wind-cutting opening | 9 blowing-off | 10 slow mold-opening | 11 fast mold-opening | 12 shifting-up |
|---|---|---|---|---|---|---|---|---|---|---|---|---|
| manually preset pressure | 40Kg | 40Kg | 10Kg | 80Kg | 0Kg | 30Kg | 30Kg | 0Kg | 0Kg | 70Kg | 30Kg | 30Kg |
| manually preset flow amount | 40L | 95L | 40L | 30L | 0L | 40L | 40L | 0L | 0L | 30L | 70L | 40L |
| flow amount at lowest motorrotation speed 400 RPM | 26L | → | → | → | → | → | → | → | → | → | → | → |
| flow amount at highest motor rotation speed 1800 RPM | 117L | → | → | → | → | → | → | → | → | → | → | → |
| flow amout at lowest oil pump rotation speed 600 RPM | 39L | → | → | → | → | → | → | → | → | → | → | → |
| flow amount at 1800 RPM by pressure flow amount | 117L | → | → | → | → | → | → | → | → | → | → | → |
| power of motor by pressure and flow amount | 2.65KW | 5.64KW | 0.66KW | 5.17KW | lowest | 1.99KW | 1.99KW | lowest | lowest | 4.52KW | 3.48KW | 1.99KW |
| Shall output power of frequency converter increase ? | NO | → | → | → | → | → | → | → | → | → | → | → |
| actual output flow | 40L | 85L | 40L | 39L | 39L | 40L | 40L | 39L | 39L | 39L | 70L | 40L |
| Shall flow ratio be used in saving for flow needed | | | | | | | | | | | | |

Fig. 7

| Operational procedures | 1 slow mold-closing | 2 fast mold-closing | 3 low pressure mold-closing | 4 high pressure mold-closing | 5 molding-closing done | 6 ejection I | 7 cjection II | 8 pressure reserved I | 9 cooling | 10 churning material | 11 slow mold-opening | 12 fast mold-opening | 13 slow mold-opening | 14 mold-opening done | 15 mold-holding in | 16 mold-holding out | 17 mold-holding done |
|---|---|---|---|---|---|---|---|---|---|---|---|---|---|---|---|---|---|
| manually preset pressure | 35Kg | 40Kg | 10Kg | 80Kg | 0Kg | 80Kg | 60Kg | 40Kg | 0Kg | 80Kg | 70Kg | 40Kg | 30Kg | 0Kg | 60Kg | 30Kg | 0Kg |
| manually preset flow amount | 40L | 70L | 40L | 25L | 0L | 90L | 60L | 30L | 0L | 60L | 30L | 70L | 30 | 0L | 30 | 60 | 0L |
| flow amount at lowest motor rotation speed 400 RPM | 26L | → | → | → | → | → | → | → | → | → | → | → | → | → | → | → | → |
| flow amount at highest motor rotation speed 1800 RPM | 117L | → | → | → | → | → | → | → | → | → | → | → | → | → | → | → | → |
| flow amout at lowest oil pump rotation speed 600 RPM | 39L | → | → | → | → | → | → | → | → | → | → | → | → | → | → | → | → |
| flow amount at 1800 RPM by pressure flow amount | 117L | → | → | → | → | → | → | → | → | → | → | → | → | → | → | → | → |
| power of motor by pressure and flow amount | 2.26KW | 4.64KW | 0.66KW | 3.31KW | lowest | 11.94KW | 5.97KW | 1.99KW | lowest | 7.96KW | 3.48KW | 4.64KW | 1.94KW | lowcst | 3.88KW | 2.98KW | lowest |
| Shall output power of frequency converter increase ? | No | → | → | → | → | → | → | → | → | → | → | → | → | → | → | → | → |
| actual output flow | 40L | 70L | 40L | 39L | 39L | 90L | 60L | 39L | 39L | 60L | 39L | 70L | 39L | 39L | 39L | 60L | 39L |
| Shall flow ratio be used in saving for flow needed | NO<br>Yes or No | → | →<br>→ | Yes<br>→ | Yes<br>→ | NO<br>Yes or No | →<br>→ | Yes | Yes | NO<br>Yes or No | Yes | NO<br>Yes or No | Yes | → | → | NO<br>Yes or No | Yes |

Fig. 9

| Operational procedures | 1 slow mold-closing | 2 fast mold-closing | 3 low pressure mold-closing | 4 high pressure mold-closing | 5 molding-closing done | 6 ejection I | 7 ejection II | 8 pressure reserved I | 9 cooling | 10 slow old-opening | 11 slow old-opening | 12 fast mold-opening |
|---|---|---|---|---|---|---|---|---|---|---|---|---|
| manually preset pressure | 30Kg | 30Kg | 0Kg | 40Kg | 50Kg | 0Kg | 0Kg | 0Kg | 0Kg | 40Kg | 30Kg | 0Kg |
| manually preset flow amount | 30L | 70L | 0L | 40L | 30L | 0L | 0L | 0L | 0L | 30L | 60L | 0L |
| flow amount at lowest motor rotation speed 400 RPM | 26L | → | → | → | → | → | → | → | → | → | → | → |
| flow amount at highest motor rotation speed 1800 RPM | 117L | → | → | → | → | → | → | → | → | → | → | → |
| flow amout at lowest oil pump rotation speed 600 RPM | 39L | → | → | → | → | → | → | → | → | → | → | → |
| flow amount at 1800 RPM by pressure flow amount | 117L | → | → | → | → | → | → | → | → | → | → | → |
| power of motor by pressure and flow amount | 194KW | 3.48KW | lowest | 2.65KW | 3.23KW | lowest | → | → | → | 2.59KW | 2.98KW | lowest |
| Shall output power of frequency converter increase ? | | → | → | → | → | → | → | → | → | → | → | → |
| actual output flow | 39L | 70L | 39L | 40L | 39L | 39L | 39L | 39L | 39L | 39L | 60L | 39L |
| Shall flow ratio be used in saving for flow needed ? | Yes | NO<br>Yes or No | Yes | NO<br>Yes or No | Yes | → | → | → | → | → | NO<br>Yes or No | Yes |

Fig. 11

CONTROL METHOD OF A HYDRAULIC MACHINE FOR SAVING ENERGY OR IMPROVING EFFICIENCY

FIELD OF INVENTION

The present invention relates to a hydraulic machine, in particular, to a pneumatic hydraulic control plan for saving energy or controlling speed increase.

DESCRIPTION OF THE RELATED PRIOR ARTS

Hydraulic machines are the most common production machines in modern industry, including, for instance, ejection machines, working machines, forging-pressure machines, compressing case machines, various specific machines, etc. Hydraulic machines of various types consumes huge amounts of electricity in operation.

Depending upon different working conditions and control parameters, the demands for pressure and electricity during operation varies, resulting in substantial variations in energy consumed, which can sometime differ by 10 times and over. Therefore, energy-saving becomes a big concern for hydraulic machines manufacturers. Many manufacturers try to save energy based on different applications of basic hydraulic principles, including, for instance, recent improvements on high vs. low pressure, oil pump hydraulic systems, varying-amount pump hydraulic machines, multi-connection pump hydraulic systems, area-different hydraulic machines, etc. Nowadays, some manufacturers also install a frequency converter right on the hydraulic machine to directly control the rotation speed of the motor in order to save energy.

Nevertheless, the above-listed conventional improvements still carry some problems, which are 1. Conventional hydraulic machines are designed only for maximum energy-saving only. That is, whenever the demand for flow amount is zero or very low, the rotation speed of motor will be accordingly controlled by the frequency converter to be zero or very slow during different working conditions or operational control. Nevertheless, each element or part of various hydraulic machines has its own characteristic; when the motor stops or rotates very slowly, the corresponding flow amount is also very low, adversely effecting hydraulic machines.

To be more specific, when the oil pump rotates too slowly due to the control of a frequency converter on the motor, the performance of the individual electric appliances and hydraulic machine parts will be effected; in addition, the pressure pulse also varies with flow amount, resulting in an fluctuating pressure value, which in turn lowering the production quality of manufactured products.
2. When the range of variance in pressure and flow amount is too large under different working conditions or operational control, it becomes harder for a frequency converter to coordinate with the motor in elevating rotation speed from very low to very high, or in dropping rotation speed from very high to very low. Moreover, the stability in production, as well as the working performance of individual appliances and the hydraulic machine parts may become a serious concern.

In the case of ejection molding machines, (1) The flow amount of an ejection molding machine in the cooling condition can go as low as zero. If the molding condition requires oil pump being activated after cooling, then the flow amount demanded by oil pump can reach as high as 50% (most of the time); the sudden jump of flow amount from zero to 50% (or 90%) results in the issue of an instant soaring in rotation speed and pressure.

(2) During the slow-speed ejection, the speed can be as low as 10%, while the high speed can be 80%; during high-speed ejection, the speed can be as high as 80%, while the low speed can be only 15%.

(3) The speed can be 90% during fast-speed mold-closing, and drops to only 20% in slow-speed mold-closing. Similarly, the speed can be only 20% during slow-speed mold-opening, and increases to 90% in slow-speed mold-opening.
3. Little concerns are given by most hydraulic machines manufacturers to having an adaptable output frequency for the frequency converter to adapt to different flow amounts or different pressure demand of hydraulic machines during operation, in order to provide most appropriate flow amount. For instance, during low-pressure operation, flowing speed can actually be increase to reduce the time in molding cycles.
4. Current hydraulic machines only takes care of the nominal allowed pressure limits of a motor, without taking into account the maximal operational pressure during actual operation. The consequence is that when a motor has reached its maximum power, and when the pressure of an oil pump is stable, there is no way to increase flow amounts to meet the requirements of working conditions; and one can only enlarge motors and oil pumps to meet the requirements of working conditions.
5. To meet the requirements of conditions in operational control and processes in work flow, there can be two or more hydraulic machines to correspond simultaneously to the layout or action of machines. Nevertheless, there is only on controller for the hydraulic machine. When the differences in speed between the two hydraulic machines are too big for the converter to well coordinate in between multiple hydraulic machines, resulting in work delay and slow reaction, which in turn makes defective products and an extended production cycle.

For instance, in CN Pat. No. 2555528, a complex control device which adjust the speed control of a frequency converter, while the frequency converter controls the motor and the electric hydraulic control valve; i.e., a frequency converter controls the rotation speed of an oil pump for output flow amounts (of oil pump) in adapting to its machine structure lay-out. In addition, an energy adjusting unit is further installed in the complex control device to improve on the response time and hence save most energy by saving time in delay.

For CN Pat. 2,555,528, the minimum operation frequency is defined based upon different pressure conditions. The way a frequency converter is controlled goes like the following:

(i) whenever the assumed (or preset) output frequency of a frequency converter is equal to or greater than the minimum operation frequency of the frequency converter, the actual output frequency of a frequency converter will then set to be the frequency calculated from the flow amounts; similarly, (ii) whenever the assumed (or preset) output frequency of a frequency converter is less than the minimum operation frequency of the frequency converter, the actual output frequency of a frequency converter will also adjusted to be the minimum operation frequency.

(iii) whenever the demand of flow amount is zero, the output frequency of a frequency converter will be zero.

The way a pressure control valve is controlled goes like the following:

(i) During acceleration state, when output flow amount of oil pump is equal to or less than 0.95 time of demanded flow amount by the hydraulic machine, the output current of the electric hydraulic control valve is set to be the maximum control current;

(ii) when output flow amount of oil pump is equal to or greater 0.95 time of demanded flow amount, and at the same time, when the demanded flow amount by the hydraulic machine is not zero, the input current of the electric hydraulic control valve is set to be the demanded the input current, to be in relative to its current dead zone.

(iii) When the demanded flow amount by the hydraulic machine is zero, the input current of the electric hydraulic control valve is set to be zero.

Nevertheless, the following defects are associated with the above-mentioned CN Pat. No. 2,555,528:

(i) The minimum operation frequency of a frequency converter is restricted by different conditions of pressure based upon the installation itself; furthermore, the flow amounts of the hydraulic machine is also restricted by the installation, or by the controlled devices as electric hydraulic control valve) installed. In other words, no consideration is given to the effect of specific characteristics of individual devices on the installation, which would adversely effect the stability of production quality in manufacturing. Due to little concern to specific characteristics of individual devices, therefore, no optimal performance of individual devices can be expected, either.

As stated above, restriction on minimum operation frequency of a frequency converter based upon different pressure demands, and current dead zone and maximum of input current of the hydraulic control valve in CN pat. No. 2,555,528, are only about the demands by the installed devices, without taking into account the effect of specific characteristics of individual devices on the installation. A disadvantage associated with CN pat. No. 2,555,528 is, for instance, when the flow amount demanded by installed devices is zero, the output frequency of the frequency converter and the input current of the electric hydraulic control valve will be both set to zero, which may adversely effect other devices and hence effect the stability of output. To be more specific, the pump flow amount is zero in cooling in the demand and control of the injection molding machine, and hence the output F of a frequency converter is zero, and the current I of the electric hydraulic control valve us zero. Nevertheless, the situation of the pump flow amount Q being zero after the stage of ejection, and pressure reservation is presumably the most energy-saving design in theory. In reality, there is always a restriction on minimum rotation speed of an oil pump. For instance, the lowest rotation speed of the ringed-leaf pump in general is 600 RPM; if rotation speed is really set to zero to make output flow amount be zero, then the rotation speed of the pump in the next stage of operational control will has to increase abruptly from zero (i.e. a complete stop) to a preset speed, which very likely to cause the leak of hydraulic oil and the wear-down of elements of the pump.

A second disadvantage with CN 2,555,528 is that when pump flow amount is zero, the speed of the motor would be zero, which will make heat dissipation harder due to the stop of the motor. Even with the installation of an additional energy-adjusting unit to speed up the response time, but, the motor still needs to overcome the rotation inertia in a short instant and to reach the expected speed. Such an imperative demand in an instant is very likely to increase the temperature of a motor. Therefore, if the cooling period is too short when the motor stops, the heat dissipation of the motor becomes a problem. Furthermore, the minimum operation frequency of the frequency converter is defined in CN 2,555,528 in terms of different conditions of pressure, which may also incur difficulty in heat dissipation due to the low rotation speed of the motor. Heat dissipation of a motor will in the long run result in degenerating insulation, which not only shorten the life cycle of the motor, but may also wear down the motor.

Other disadvantages with CN 2,555,528 include the restriction of current dead zone Id by the electric hydraulic control valve on the minimum flow amount of a hydraulic machine, without taking into accounts specific characteristics of individual devices during actual operation. For instance, when the pump flow amounts is 3 L/minute, which corresponds to the current dead zone Id (of the electric hydraulic control valve), even though the afore-mentioned set-up would prevent the electric hydraulic control valve from breaking down, since the output flow amount of the pump is 50 cc per RPM, the speed corresponding to 3 L/minute would then be 60 RPM. But, the fact is the minimum rotation speed of a pump for an ordinary operation requires 600 RPM. Therefore, a 60 RPM for a pump would cause leaking of hydraulic oil and wearing-down of the pump, which in turn creates a low efficiency working condition for other devices, degenerating working operation, and hence an unstable production line as well as increasing amounts of defective products.

A common unsatisfactory design existing in prior arts of hydraulic machines is the overlook of optimal contribution of individual elements to the overall performance of a hydraulic machine, which hardly causes any extra manufacturing cost. For instance, the motor in a hydraulic machine is in general labeled for an allowed pressure level for safety concern. Nevertheless, in a power system, the actual pressure for a motor can surpass the labeled allowed pressure, due to the variable load in the circuit. In the case of a motor controlled by a frequency converter, since the motor elements are directly controlled by the frequency converter, the motor can therefore be controlled to surpass the labeled allowed pressure level, which maximally utilizes the motor elements without incurring an extra cost in manufacturing.

To sum up, a requirement to be included in any improvements of hydraulic machines involves the energy-saving and speed control in operating hydraulic machines, which shall take into account effect of specific characteristics of individual elements on the overall performance of machines without incurring an extra cost in manufacturing.

SUMMARY OF INVENTION

The current invention applies to a control plan for energy-saving or production increase of a hydraulic machine, which coordinate specific characteristics of individual elements to optimally enhance the stability of machines, the production efficiency and product quality.

Procedures involved in the control plan include:

1 One or more control plans for pressure or flow amount of a hydraulic machine for energy-saving or production increase, which comprises:

an energy-saving control plan for the demand of energy-saving;

a speed-increase control plan for increase production efficiency;

an energy-saving control plan which also provides speed-increase control;

a speed-increase control plan which also provides energy-saving control.

All the above-mentioned four plans can be stored in the controller of the hydraulic machine or other device with storage function; while the plan to be executed is either decided by the controller or by the commands input by a user.

2. Setting up and inputting working conditions: This refers to the input of working conditions into hydraulic machines before each operational cycle or during operational processes, which involves preset pressure or flow amount at different stages and requirements related to other controls.

3. Examination in working conditions and processes of hydraulic machines: this refers to the auto-examination of the controller of the hydraulic machine during operational processes.

4. Updating demands in control plan based on working conditions and processes of hydraulic machines to control the machine: the control plan can coordinate specific characteristics of individual elements and can be stored in advance in the controller of the machine. Control plans can be stored in the controller right after the machine is manufactured or can be further updated based on characteristics of elements replaced or changed after being manufactured). In operational control, a user only needs to input demanded parameters and conditions (such as pressure, flow amounts and working conditions) for a controller to make a decision (or for the user himself to decide) on the most suitable control plan for working conditions.

5. Individual elements of hydraulic machines include an engine, energy supplier for engine, working valve for controlling operation, control valve for pressure, control valve for flow amounts, pipe circuits of a hydraulic machine, oil filter net, cooler, stopping valve, temperature control element, or other elements applied to pressure and flow amounts of the machine.

After adopting the above control plans, the current invention provides adequate control solutions for energy-saving, increasing production stability, and durable life cycles of elements.

BRIEF DESCRIPTION OF DRAWINGS

FIG. 7 illustrates the system pressure, flow amounts and coordinated actions of individual elements when applying current invention to a given condition of a blowing-bottle manufacturing machine.

FIG. 9 illustrates the system pressure, flow amounts and coordinated actions of individual elements when applying current invention to a given condition of a rubber product machine.

FIG. 11 illustrates system pressure, flow amounts and coordinated actions of individual elements when applying current invention to a given working condition of a Polystyrene product machine.

DETAILED DESCRIPTION OF A PREFERRED EMBODIMENT

Figure 1:
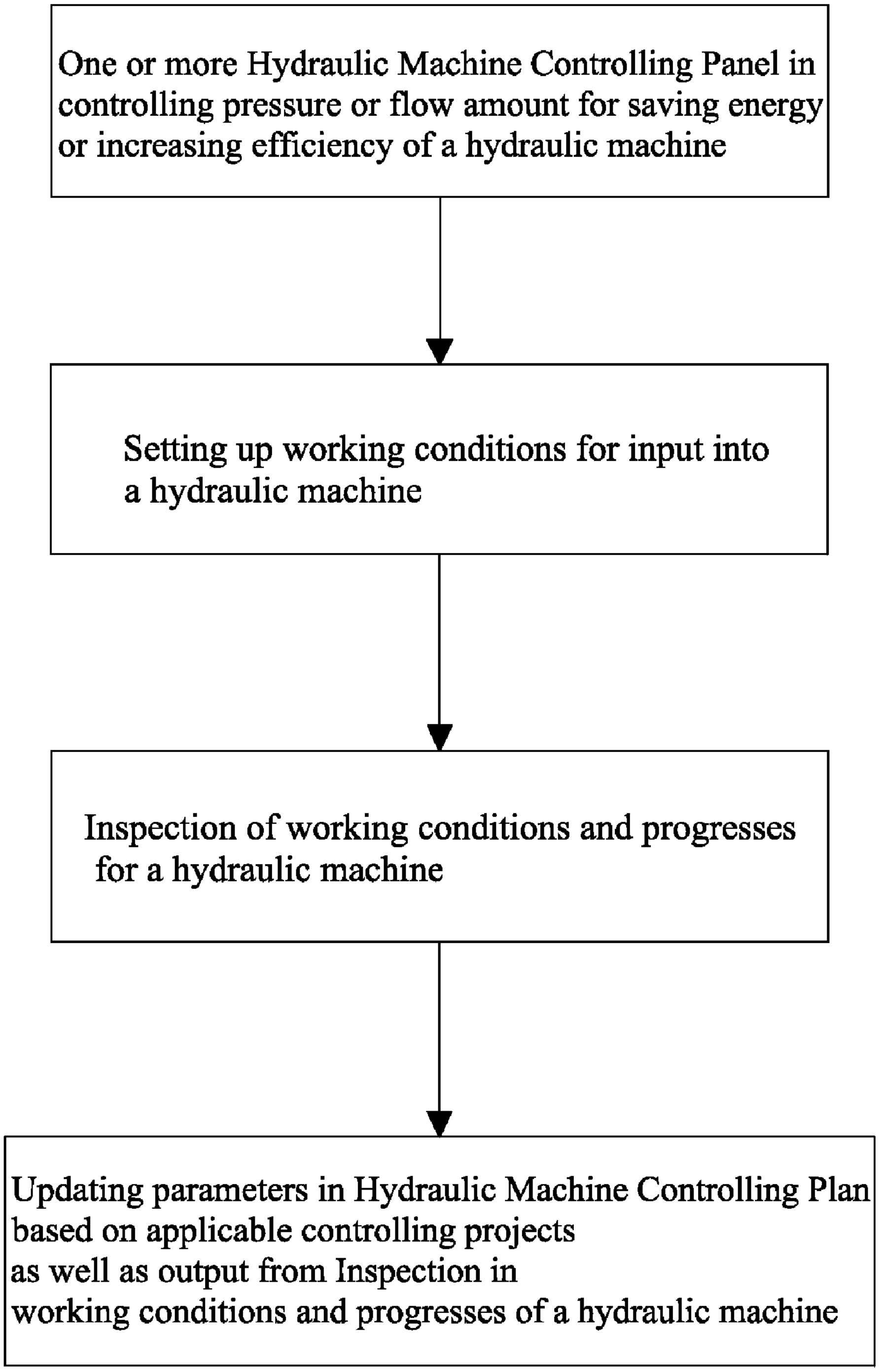
FIG. 1 is the flow chart of the procedures in the control plan for energy-saving or production efficiency increase of hydraulic machines.

Referring to FIG. 1, the control plan disclosed in this invention includes the following procedure:

One or more control plans for pressure or flow amount of a hydraulic machine for energy-saving or production increase, which comprises:

an energy-saving control plan for the demand of energy-saving;

a speed-increase control plan for increase production efficiency;

an energy-saving control plan which also provides speed-increase control;

a speed-increase control plan which also provides energy-saving control.

All the above-mentioned four plans can be stored in the controller of the hydraulic machine or other device with storage function.

2. Setting up input working conditions: This refers to the input of system pressure values and preset flow amounts for different working conditions into hydraulic machines before each operational cycle or during operational processes for execution in operation of hydraulic machines.

3. Examination in working conditions and processes of hydraulic machines: this refers to the auto-examination of the controller of the hydraulic machine during operational processes.

4. Updating demands in control plan based on working conditions and processes of hydraulic machines to control the machine: the control plan can coordinate specific characteristics of individual elements and can be stored in advance in the controller of the machine. Control plans can be stored in the controller right after the machine is manufactured or can be further updated based on characteristics of elements replaced or changed after being manufactured). In operational control, a user only needs to input demanded parameters and conditions (such as pressure, flow amounts and working conditions) for a controller to make a decision (or for the user himself to decide) on the most suitable control plan for working conditions.

5. Individual elements of hydraulic machines refer to one single specific element or a inter-combination of a few individual elements; individual elements include an engine, energy supplier for engine, working valve for controlling operation, control valve for pressure, control valve for flow amounts, pipe circuits of a hydraulic machine, oil filter net, cooler, stopping valve, temperature control element, or other elements applied to pressure and flow amounts of the machine.

The above-stated elements like an engine and an energy supplier for engines could be implemented as a direct current motor coupled with a direct current supplier, or an Alternate current coupled with an alternate current supplier; and the alternate current supplier can be implemented as an AC/AC frequency converter, a DC/AC current switch or other alternate synchronous generator. In the case of a frequency converter, the goal is to coordinate the control characteristics of a frequency converter with the controller of a hydraulic machine when applying the control plan (as disclosed in the invention) to operating the hydraulic machine.

While the control valve for pressure and flow amounts can be implemented, respectively, as pressure control valve or pressure ratio control valve, and flow amount control valve or flow amount ratio control valve or variable amount pump. The size and format of the pipe circuit can be manufactured to adapt to the system flow speed for energy-saving or speed increase purpose.

The above-mentioned specific characteristics of individual elements can be stored in the controller of the hydraulic machine or other device with storage function before final stage of manufacturing, or can be updated after replacement of individual elements when necessary. The control plans disclosed in this invention run during operation of a hydraulic machine, based on specific characteristics of individual elements, adequate working conditions, auto-examination of working conditions, and adequate pressure and flow amounts as set in the control plan; while the plan to be executed is either decided by the controller or by the commands input by a user.

Figures 1, 2:
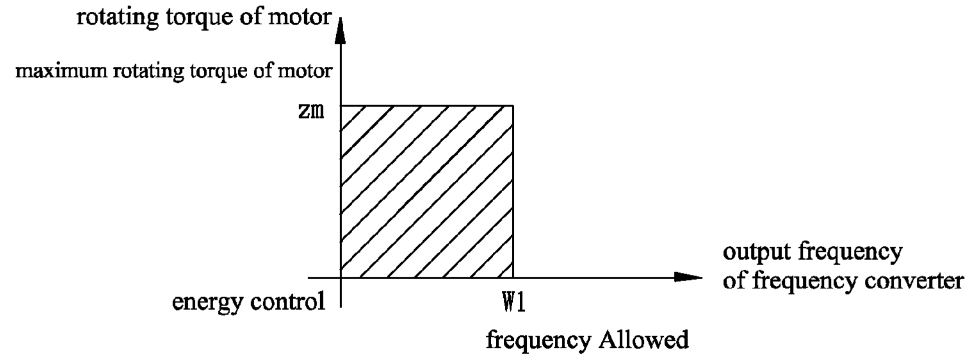
FIG. 2 illustrates the relationship between rotation torque of motor and output frequency of frequency converter.
Figure 2:
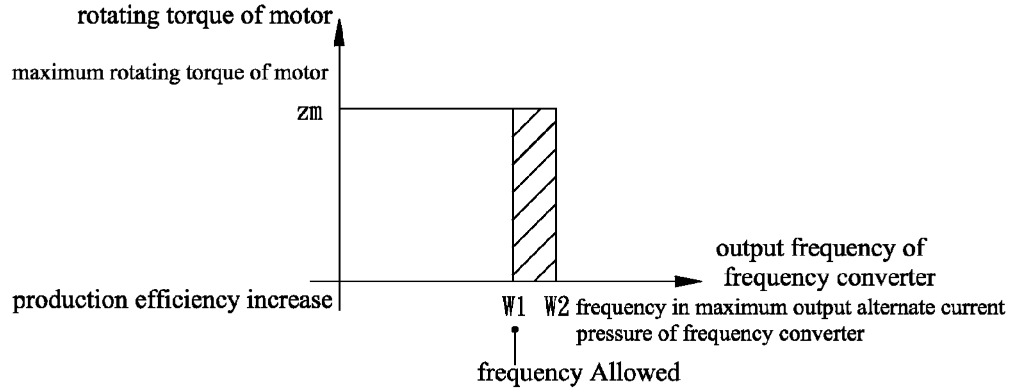

FIG. 2 further illustrates a preferred embodiment of the invention with the relationship between rotation torque of motor and output frequency of frequency converter. W1 refers to the allowed motor frequency, and W2 indicates the frequency of a frequency converter when outputs maximum alternate current. FIG. 2 serves for illustration purpose, and is not restricting current invention.

Due to energy-saving demand, the flow amount is adequately decreased and the pressure or flow amounts acts in coordination with specific characteristics of individual elements. As shown in figures, within the range of allowed maximum rotation torque and allowed frequency W1 (as shown by the slanted lines), the control plan takes into account specific characteristics of individual elements to reduce adequately flow amounts and hence saves energy.

To increase production efficiency, an extra flow amount is added to the maximum flow amount of a hydraulic machine while making sure the toque is at its maximum. As shown in the figures, while keeping constant the maximum current of a frequency converter, the control plan increases output alternate pressure and frequency of the frequency converter, and at the same time, increases the motor power and rotation speed (i.e. below the maximum rotation torque and within safety limits of the motor current) to increase flow amounts of the hydraulic machine for speed increasing.

The way the motor power factor is increased is explained below:

$$\text{output motor power} = \text{rotation toque} \times \text{rotation speed} \quad (1)$$

Increasing frequency of a frequency converter will increase motor rotation speed, and hence will also increase output motor power;

$$\text{power} = \text{pressure} \times \text{current} \times \text{power factor} \quad (2)$$

When output pressure of a frequency converter increase with frequency increase (under the circumstance that the maximum current of the frequency converter is kept constant), the maximum motor output power factor will also increase. Accordingly, the maximum output power is generated without augmenting the motor; and the flow amounts can be increased to improve operation efficiency.

When working conditions for manufacturing products requires speed increase, the control plan will increase the output pressure of the frequency converter to increase the motor power to sustain the added load at high rotation speed and to increase the operation rate by increasing flow amounts.

An energy-saving control plan disclosed in this invention aims at increasing production efficiency, which would adequately increase the maximum flow amounts while, at the same time, adequately decrease pressure. As shown by figures, the motor rotation torque will be controlled to decrease to reduce pressure whenever the rotation torque goes over the allowed frequency W1, which saves energy and increase speed within safety control. In addition, the increase in output frequency of a frequency converter will increase rotation speed of the motor, the flow amounts and the speed to save energy and increase production efficiency.

An energy-saving control plan disclosed in this invention aims at increasing production efficiency, which would adequately increase the maximum flow amounts while, at the same time, adequately decrease pressure. As shown in figures, the control plan increases the frequency of a frequency converter to above W2 (and below the maximum output frequency) to increase the motor rotation speed and flow amounts to increase speed. The output pressure of a frequency converter remains unchanged even when the frequency of the frequency converter is above W2, which reduces the motor rotation torque corresponding to frequency above W2 and hence reduces pressure for safely increasing speed and saves energy, as shown by the slanted part in the figures.

A preferred embodiment of this invention is disclosed below in the case of a ejection machine; any hydraulic machines can also apply this invention in coordination with the specific characteristics of hydraulic machines.

Figures 2, 3:
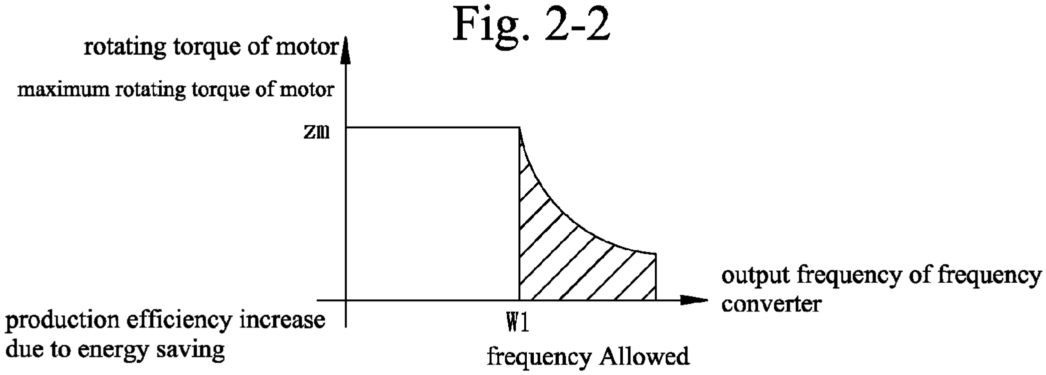
FIG. 3 illustrates the application of the current invention to a control plan of energy-saving or production efficiency increase of an ejection machine.

Referring to FIG. 3, an energy-saving and production efficiency increasing control plan is applied to an ejection machine. In particular, the ejection machine shown in FIG. 3-1 is of a small to medium size, of which an ejection machine controller controls the pressure ratio control valve, the flow ratio control valve, the frequency converter, the motor, and the oil pump; the frequency converter cooperates with the ejection machine controller to coordinate the ejection machine with the frequency converter to avoid slow reaction due to delay, lagging production cycles, and defective products.

An input device can be installed either externally or internally on the ejection machine controller for a user to key in commands for choosing a desired control plan. Alternatively, the ejection machine controller may decide by itself the control plan to be executed. FIG. 3 illustrates a preferred embodiment of this invention with an example of an ejection machine, serving not as an limitation.

FIG. 3-2 illustrates with a twin-colors ejection machine, which has one main controller to be in charge of two sub-controllers; each sub-controller controls a set of pressure ratio control valves, a flow amount ratio control valve, a frequency converter, a motor, and an oil pump. The frequency converter can further cooperates with the main controller of the twin-colors ejection machine to coordinate the operation of the twin-colors ejection machine with that of the frequency converter. An input device is installed either externally or internally in the sub-controllers for users to key in commands to decide on a given control plan; alternately, the decision upon a specific control plan can be automatically made by the twin-colors ejection machine.

In the case of a triple-colors ejection machine, a main controller controls three sub-controllers (not shown in the figures), and each sub-controller controls a set of hydraulic controlling devices.

FIG. 3 shows a large-size ejection machine. Due to the large flow amounts of a large-size ejection machine, more than one flow valves are required. A controller has to be in charge of two sets of pressure ratio control valves, flow ratio control valves, frequency converters, motors, and oil pumps. The two frequency converters can further cooperate with the main controller of the twin-colors ejection machine to coordinate the operation of the large-size ejection machine with that of the frequency converter. An input device is installed either externally or internally in the sub-controllers for users to key in commands to decide on a given control plan; alternately, the decision upon a specific control plan can be automatically made by the large-size ejection machine.

Figures 2, 3, 4:
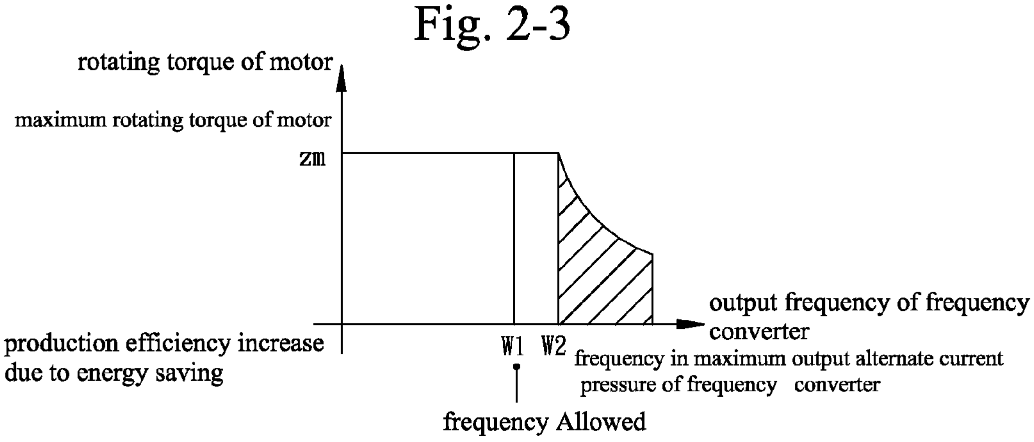
FIG. 4 illustrates the pressure, flow amounts, and actions of coordinated individual elements in applying current invention to a given working condition of an ejection machine.
Figures 1, 3:
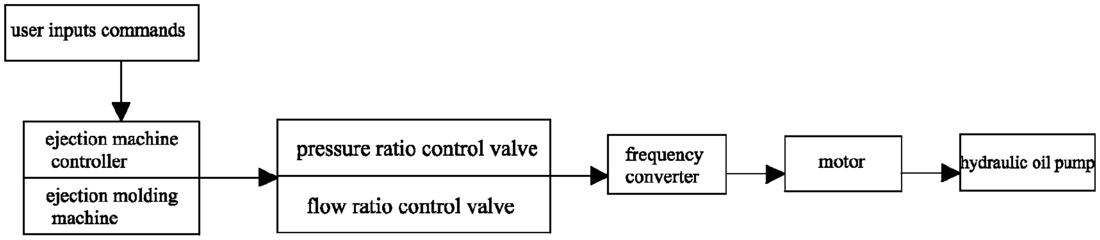
Figures 2, 3:
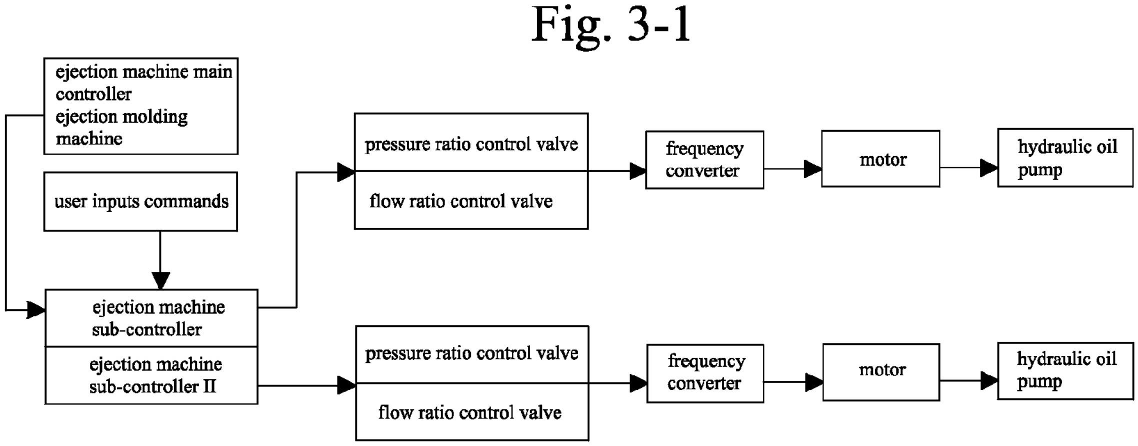
Figure 3:
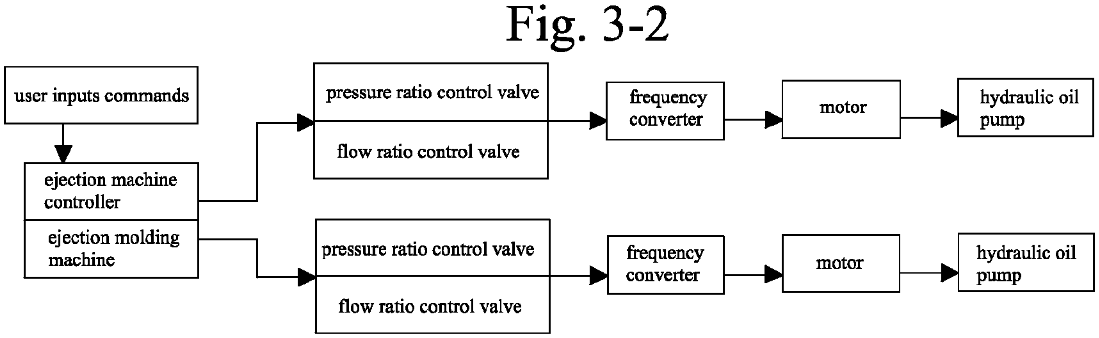
Figures 3, 4:
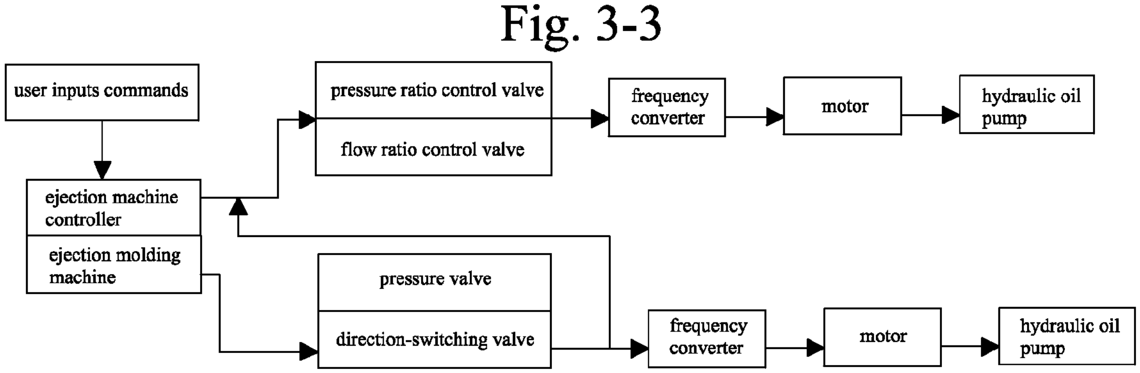

FIG. 3-4 shows another large-size ejection machine, which has one main controller to be in charge of two sub-controllers; each sub-controller controls a set of pressure ratio control valves, a flow amount ratio control valve, a frequency converter, a motor, and an oil pump. The frequency converter can further cooperates with the main controller of the twin-colors ejection machine to coordinate the operation of the twin-colors ejection machine with that of the frequency converter. An input device is installed either externally or internally in the sub-controllers for users to key in commands to decide on a given control plan; alternately, the decision upon a specific control plan can be automatically made by the twin-colors ejection machine.

In the case of a triple-colors ejection machine, a main controller controls three sub-controllers (not shown in the figures), and each sub-controller controls a set of hydraulic controlling devices.

FIG. 3-4 shows a large-size ejection machine. A controller is in charge of a set of a pressure ratio control valves, a set of flow ratio control valves, a set of pressure valves, direction switches. The oil pipes of the pressure valves and direction switches are connected with pressure ratio control valves and flow ratio control valves; coordination among pressure valves, direction switches, and oil storage system provides large flow amounts.

A pressure ratio control valve, a flow ratio control valve, and a pressure valve also coordinate with a set including frequency converters, motors, and hydraulic oil pumps. The two frequency converters cooperate with the main controller. An input device is installed either externally or internally in the sub-controllers for users to key in commands to decide on a given control plan; alternately, the decision upon a specific control plan can be automatically made by the large-size ejection machine.

According to FIG. 3-2, two or more ejection systems are used in the twin-colors or multiple-colors machines, each rotates independently by itself. But ejection systems are synchronously under the control of commands of the controller when it comes to operation and switching, which is dealt with by its own motor. Accordingly, for this kind of ejection machines, there shall be two or more motors and oil pumps included, each requires a separate frequency converter to work with. There is only one main controller. But during ejection, stirring of the oil pressure motor and seat-in or seat-out, two or more sub-controllers inside of the main controller will synchronously be in charge of these operations.

Referring to FIG. 3-3, due to the restriction of flow amounts on flow control valve of a large-size ejection machine, flow amounts from multiple sets of oil pumps cannot run through a single flow ratio control valve, accordingly, there comes to the requirements of two or more flow ratio control valves for flow to run through the direction switch or logic gates in order to operate oil compress tank or oil compress devices. In the mean time, the number of frequency converters will increase with the increasing number of motors and oil pumps. For concern of operational stability, in general, a single frequency converter will control independently a single motor so that multiple motors will synchronously move the oil pump in a steady and fast way. Therefore, the best solution is to control by a machine, which will set up in advance the required working conditions and operational procedures for a synchronous output flow.

Referring FIG. 3-4, two or more motors and oil pumps are required to operate appropriately the flow amount control valves for a large-size ejection machine; each motor has to be exact in timing for outputting synchronously an exact amount of flow to the assigned flow ratio control valve; while the number of frequency converters also increase with the increasing number of motors and oil pumps; a single frequency converter will control independently a single motor so that multiple motors will synchronously move the oil pump in a steady and fast way. Therefore, the best solution is to control by a machine, which will set up in advance the required working conditions and operational procedures for a synchronous output flow.

Furthermore, similar to what stated above, pressure control valve and flow ratio control valve can also be controlled by the controller of an ejection machine. The ratio control valves are in charge of pressure and flow amounts; the controller of an ejection machine is in charge of the frequency converter; the frequency converter controls the motor; the frequency converter has its own controller, under the command of external electrical signal inputs.

The control plan for energy-saving or production efficiency increase, disclosed in this invention, incorporates the concept and implementation of energy-saving, speed increase, specific characteristics of individual elements, pressure and flow amounts at different working stages, etc in the controller of a hydraulic machine. In advance of the operation of a hydraulic machine, parameters are first input to the controller, based on specific characteristics of individual elements and working conditions and operational procedures; for instance, parameters of pressure and flow amounts are different at different stages of mold-closing, seat-in, ejection, mold-opening, mold support, etc., and hence need to be input to the controller. A user would input operational commands in pressure values and flow amounts. More examples are given below.

In actual operation, the controller of an ejection machine controls both the ejection machine and the frequency converter; the frequency converter is connected with the motor and the oil pump. The controller of the ejection machine sets up the values in output frequency, maximum flow amount and minimum flow amount, corresponding to different hydraulic machine types and different working stages. The controller of an ejection machine also sets up the upper and lower limit in rotation speed for the motor and the hydraulic oil pump. Whenever the required rotation speed or flow amount is less than the preset minimum rotation speed or flow amount, the controller would reset the output frequency of the frequency converter to be the minimum rotation speed in order to maintain adequate rotation speed of the motor and the oil pump. In the meantime, the controller of the ejection machine in charge of the flow amount ratio control valve. Similarly, whenever the required rotation speed or flow amount is higher than the preset minimum rotation speed or flow amount, the actual flow amount will then be controlled by the motor and the oil pump, which are in turn controlled by the frequency converter. Or, alternatively, the actual flow amount can also be controlled by the flow ratio control valve. Whenever the required pressure is low, the controller of the ejection machine will (within the upper limit on rotation speed of the hydraulic oil pump) automatically increase frequency of the frequency converter, increase the rotation speed of the motor and the hydraulic oil pump, and also increase the output flow of the hydraulic oil pump, based on the preset operational conditions in the controller.

The control plans of this invention can be further understood in the following examples:

(1) Energy-Saving Control Plan:

In the case of an ejection molding machine, when the frequency is at 60 Hz, and the rotation speed of the motor is at 1200 RPM, assume the output flow of the oil pump is 80 l/m and the flow amount of the ejection machine is 80 l/m, either the controller can decide itself or the user can input commands to make the controller of the ejection molding machine to adjust the frequency of the frequency converter to 600 RPM; as a result, the output flow amount of the oil pump would drop to 40 l/m, which achieves energy saving. The current invention may use a frequency converter to control rotation speed of a motor in order to control the flow amounts.

(2) Speed-Increase Control Plan:

In the case of an ejection molding machine, when the frequency is at 60 Hz, and the rotation speed of the motor is at 1200 RPM, assume the output flow of the oil pump is 80 l/m and the flow amount of the ejection machine is 90 l/m, and the maximum system pressure needs to be maintained at 140 kg (i.e. the preset maximum pressure of the machine), the controller will automatically increase the input pressure 220 V of the frequency converter to an output pressure 247.5 V, and also increase the original rotation speed 1200 RPM to 1350 RPM, the output flow amount of the oil pump at this point will be increased to 90 l/m, while the pressure is still kept at 140 Kg.

(3) A Speed-Increase Control Plan for Saving Energy

In the case of an ejection molding machine, when the frequency is at 60 Hz, and the rotation speed of the motor is at 1200 RPM, assume the output flow of the oil pump is 80 l/m and the flow amount of the ejection machine is 80 l/m, and the flow amount of the ejection machine is 100 l/m, while the maximum system pressure requires only 80 kg, either the controller automatically resets the maximum system pressure at 80 Kg (pressure values below 80 Kg can be manually adjusted), or the user key in commands to manually reset maximum system pressure at 80 Kg; while the frequency of the frequency converter is adjusted to 1500 RPM; and the output flow of the oil pump increases to 100 l/m; pressure is limited to be below 80 Kg. Then, energy is saved by re-setting pressure threshold; the frequency converter control motor speed elevation as well as oil pump increase to increase speed.

(4) An Energy-Saving Control Plan for Increasing Speed

In the case of an ejection molding machine, when the frequency is at 60 Hz, and the rotation speed of the motor is at 1200 RPM, assume the output flow of the oil pump is 80 l/m and the flow amount of the ejection machine is 80 l/m, the maximum system pressure of the ejection machine under the condition is 140 Kg. The maximum output alternate current pressure within safety limits is 247.5 V. The maximum rotation speed of the motor is assumed to be 1500 RPM. The flow amount demanded by the ejection machine is 100 l, and the pressure is 140 Kg. The controller increases the original output pressure of a frequency converter 220 V to an output pressure 247.5 V, and also increases the original rotation speed 1200 RPM to 1500 RPM to speed up flowing. In the mean time, the system pressure is reduced to 126 Kg. (original system pressure/frequency increase ratio=actual pressure) to save energy.

Additionally, this invention can also incorporate within specific characteristics of individual elements to avoid erroneous inputs by users.

In the case of an ejection molding machine, the ejection pressure is set at 100 Kg at the action of ejection, and the ejection speed is set at 7.81 l/m; at this point, the frequency is 60 Hz, the speed of the motor is 1200 RPM, and the oil pump amount is 78 l/m; the speed of the ejection flow requires only 7.8 l/m; the rotation speed of the motor requires only 120 RPM; the rotation speed of the oil pump also requires only 120 RPM. The minimum rotation speed of the oil pump used is 600 RPM; the minimum rotation speed demanded by the motor is 400 RPM. Even if the operators set the ejection speed of the controller at 7.8 l/m, i.e. 120 RPM (irrespective of setting), the controller of the ejection machine would still automatically detect and increase rotation speed to 600 RPM, i.e. oil pumps at 39 l/m, while the extra flow would flush out automatically by flow amount control valve. That is, the machine is able to automatically detect rotation speed, flow amount, or pressure, and provides within safety range parameters to control rotation speed of the frequency converter to save energy.

Figure 5:
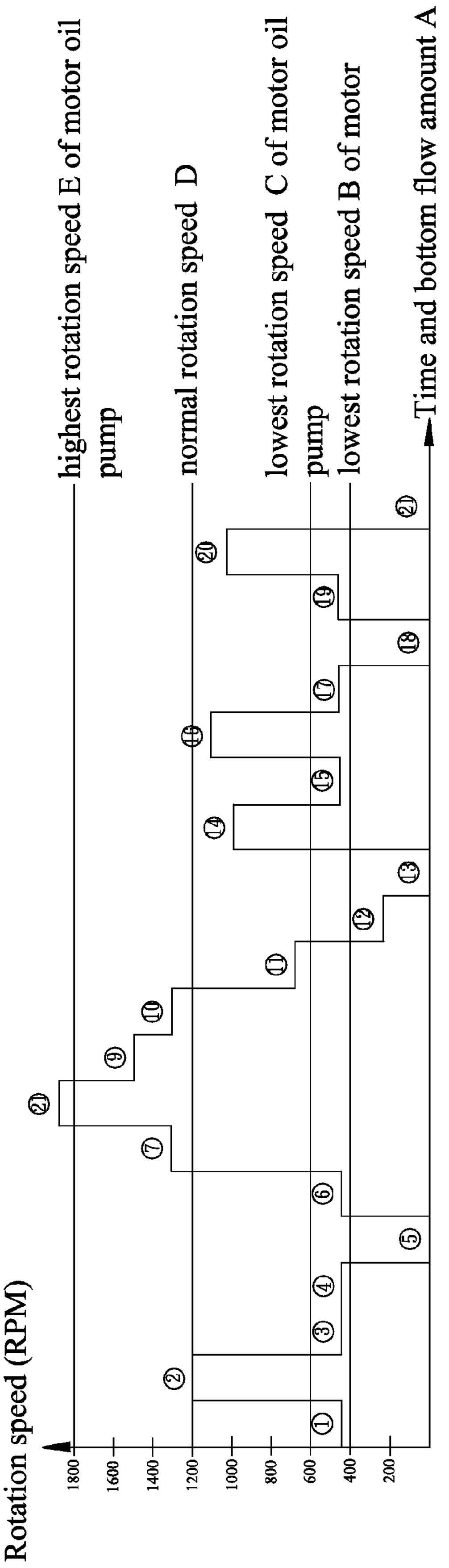
FIG. 5 illustrates the rotation speeds of individual elements at different working stages, when applying current invention to different working conditions of an ejection machine.
Figure 6:
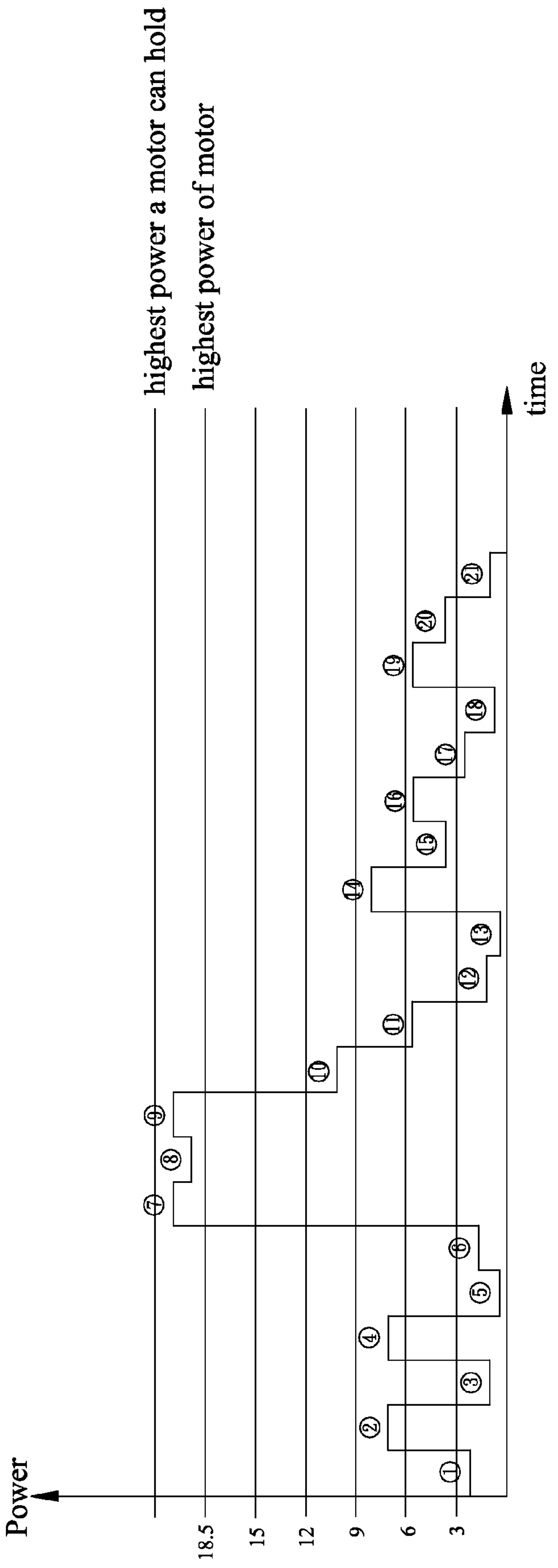
FIG. 6 illustrates the powers at different working stages when applying current invention to different working conditions of an ejection machine, applying current invention to different working conditions of an ejection machine.

Referring to FIG. 4 to 6, FIG. 4 illustrates the setting up of input working conditions, system pressure and flow amounts, and specific characteristics of individual elements in applying current invention to an ejection machine. FIG. 5 illustrates the rotation speed of the ejection machine, corresponding to hydraulic elements at different working stages; when the maximum pressure of the ejection machine is at 140 Kg, frequency at 60 Hs, the motor rotates at 1200 RPM, the power at 18.5 KW, the oil pump at 78 l/m, the maximum alternate current pressure is 240 V.

The working conditions at different operational stage of the ejection machine are input to the controller of the ejection machine, including (1) slow mold-closing; (2) fast mold-closing; (3) low mold-closing pressure; (4) high mold-closing pressure; (5) mold-closing done; (6) seat-in; (7) ejection I; (8) ejection II; (9) ejection III; (10) ejection IV; (11) pressure reserved I; (12) pressure reserved II; (13) cooling; (14) material stirring; (15) slow mold-opening; (16) fast mold-closing; (17) slow mold-opening; (18) mold-opening done; (19) mold-support in; (20) mold-support out; (21) mold-support done.

As shown in FIG. 4, when at the stage 1 of slow mold-closing, the command input by the user sets the pressure at 30 kg, the flow amount at 30 l; but the minimum out-flow of the oil pump is 39 l; therefore, the controller of the ejection machine will reset the motor rotation speed at 600 RPM, following the control plan and coordinated with characteristics of an oil pump, so that the out-flow of the oil pump is at the minimum safety value of 39 l, which saves energy. The extra 9 l oil flow will then be flushed out via the flow ratio control valve, which is in turn controlled by the ejection machine controller. As shown in the figure, stage (3) low mold-closing pressure, (4) high mold-closing pressure, (5) mold-closing done, (6) seat-in, (12) pressure reserved, (13) cooling, (15) slow mold-opening, (17) slow mold-opening, (18) mold-opening done (19) mold-support in, and (21) mold-support done all can operate in correspondence to the control plan to save energy; when the set flow amount is more than the minimum flow amount of the oil pump 39 l, the flow ratio control valve can be dispensed with (or alternately, the flow ratio control valve can be controlled by the controller of the ejection machine).

As shown in FIG. 4, during the stage of (7) ejection I, preset pressure is at 140 kg, preset flow amount is at 100 l, the then calculated motor power will be 20.18 KW, greater than the motor power 18.5 KW; the controller of the ejection machine in the speed-increase control plan can then increase the output pressure of the frequency converter to the maximum pressure 240 V to enhance the motor power. The controller presets a guaranteed ejected pressure level, a user can issue a command without changing conditions, the ejected flow amount would then reduce to 85 l; i.e. the speed is increased without augmenting the motor.

As shown in FIG. 4, the stage (8) of ejection II is pretty much the same as stage (7). Due to the limitation of elements applied, the output flow amount is restricted to 117 l. If the output frequency of the frequency converter is too large and endanger the motor, then the controller of the ejection machine will increase the pressure of the frequency converter only to the maximum output pressure and gives a warning signal to the operator.

As shown in FIG. 4, the stage (9) of ejection III presets flow amount as 100 l, which is greater than the normal oil pump out-flow 78 l, and the pressure is 140 Kg. At this point, a user can input commands to the controller of the ejection machine to execute the energy-saving control plan for speed increase, which operates under the condition of always having a flow; the output pressure of the frequency converter is increased to 240 V, while the flow amount is increased to 100 l/m to guarantee a speed-increasing flow, and also to reduce pressure for energy saving.

As shown in FIG. 4, at stage (10) of ejection IV, preset flow amount is at 80 l, greater than the normal flow amount of 78 l, and the preset pressure is at 80 Kg. At this point, a user can input commands to execute the energy-saving control plan for speed increasing by increasing the frequency of the frequency converter, which in turn increases the rotation speed of the motor and also increase the oil pump output to 80 l to save energy by increasing speed.

Furthermore, due to the large demand of flow amount from stage of ejection I to stage of ejection (IV), a machine operator can directly execute speed-increasing control plan by directly issue commands to the controller of an ejection machine; the controller of an ejection machine will react to working conditions in adjusting speed increase.

FIG. 5 illustrates the rotation speeds of individual elements at different working stages, when applying current invention to different working conditions of an ejection machine. A denotes bottom flow amount; B, adequate low rotation speed of the motor; C, adequate low rotation speed of an oil pump; D, normal rotation speed, E, adequate high rotation speed of the motor; among them, 1. within the range of C to E, the controller of an ejection machine executes the energy-saving or/and speed-increase control plan; when the condition is below C, the restriction of specific characteristics of hydraulic elements (corresponding to condition C) and the preset values inside the controller adjusts automatically the lower limit to C (from below C); similarly, when the condition is above E, the controller adjusts automatically the upper limit to E (from above C).

2. Within the range of C to E, the controller of an ejection machine can also be executed by a user.

3. When the operation condition is between A to C, or above E (i.e. inappropriate operation), the controller of the ejection machine would automatically detect and react by writing off the exceeded amount and give out error or warning signal.

Additionally, at the stage of (8) ejection II, when rotation speed of the motor or the oil pump is too high, the controller of the ejection machine would automatically detect, react by reducing the speed, and give the operator a warning signal.

As shown in FIG. 6, illustrates the powers at different working stages of the ejection machine. In this invention, whenever the required power is over the motor power of 18.5 kw, the controller of the ejection machine would issue commands to the frequency converter, and increase the pressure of the frequency converter under the condition that the motor can endure the increased pressure within safety limit.

When the output pressure of the frequency converter is too big to damage the motor, the controller of the ejection machine will make sure no output pressure is greater than the maximum output pressure; and a warning signal is also sent to the user.

Values of parameters used in the ejection machine shown above are only for illustration purpose, and shall not be interpreted as a restriction on the scope of this invention; this invention is also applicable to other hydraulic machines for saving energy or increasing speed.

Figure 8:
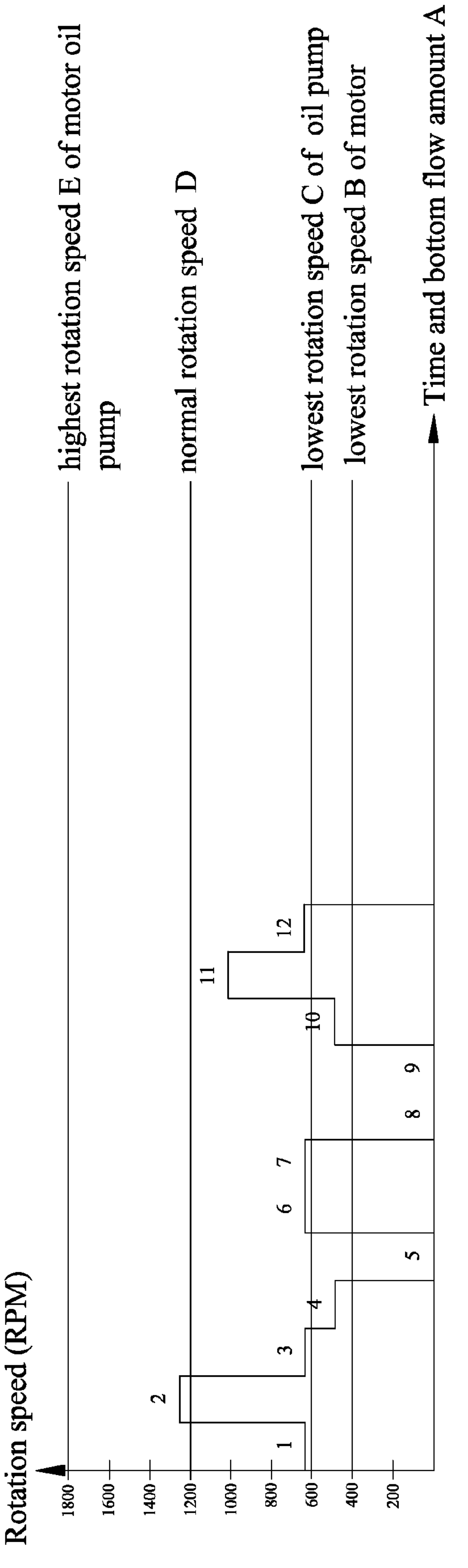
FIG. 8 illustrates rotation speeds of individual elements when applying current invention to different working stages of a blowing-bottle compressing machine.

FIG. 7 shows the system pressure, flow amounts and coordinated actions of individual elements when applying current invention to a given condition of a blowing-bottle manufacturing machine. FIG. 8 illustrates rotation speeds of individual elements when applying current invention to different working stages of a blowing-bottle compressing machine. Likewise, the controller of the blowing-bottle compressing machine can automatically decide or be commanded by a user to save energy by controlling the frequency converter to reduce speed and hence oil pump out-flow, at the stage of (1), (3), (6), (7), (11) or (12), when the preset flow amount is below 78 l/m. At the stage of (2), i.e. fast mold-closing, since the flow is above the normal flow amount of 78 l/m, the speed-increase control plan can be executed, which would increase the frequency of the frequency converter to speed up the motor, and the output flow of the oil pump would hence reach n increasing speed of 85 l/m; while at the stage (4), (5) (8), (9) and (10), individual elements are coordinated (such as the lowest speed of the oil pump is considered) to enforce out-flow increase for machines to run safely and normally.

Figure 10:
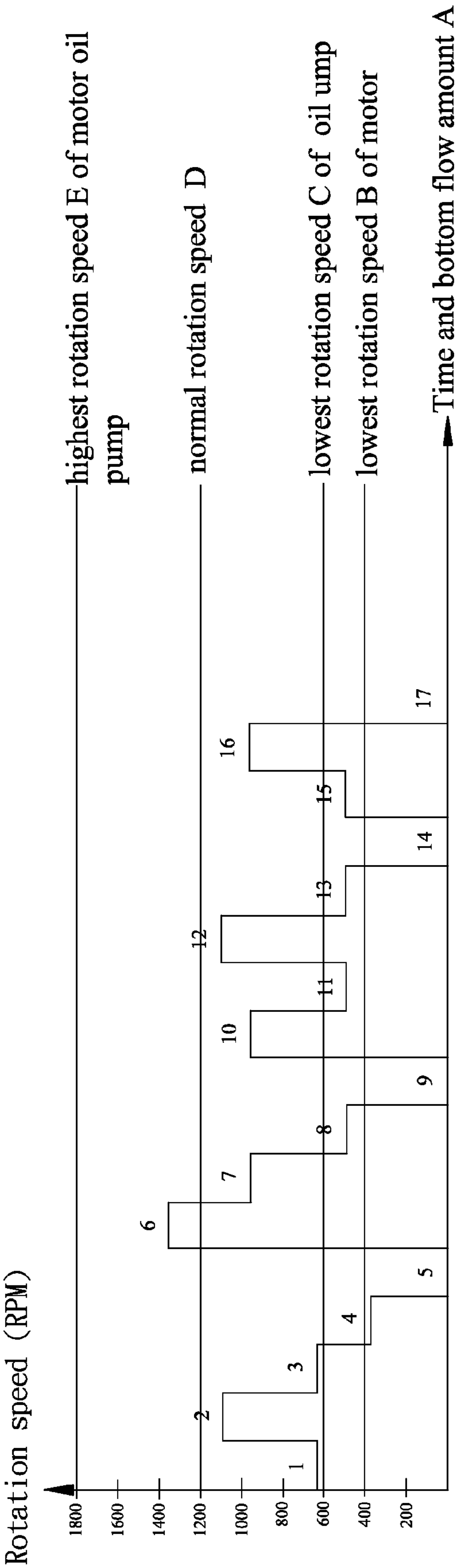
FIG. 10 illustrates rotation speeds of individual elements when applying current invention to different working stages of a rubber product machine.

FIG. 9 illustrates the system pressure, flow amounts and coordinated actions of individual elements when applying current invention to a given condition of a rubber product machine. FIG. 10 illustrates rotation speeds of individual elements when applying current invention to different working stages of a rubber product machine. Likewise, the controller of the rubber product machine can automatically decide or be commanded by a user to save energy by controlling the frequency converter to reduce speed and hence oil pump out-flow, for instance, at the stage of (1) to (3), (7), (10), (12) and (16); at the stage of (6) ejection I, since the preset flow amount is greater than the normal out-flow of 78 l/m, the speed-increase control plan will be executed, which increase the frequency of the motor speed by increasing the frequency of a frequency converter for oil pump out-flow to reach 85 l/m. At the stage of (40, (5), (8), (9), (11), (13), (14), (15) and (17), the preset flow amount is lower than that of individual elements (for instance, the oil pump flow amount at lowest rotation speed is 39 l). The controller would then enforce flow increase to 39 l for safe and normal operation.

Figure 12:
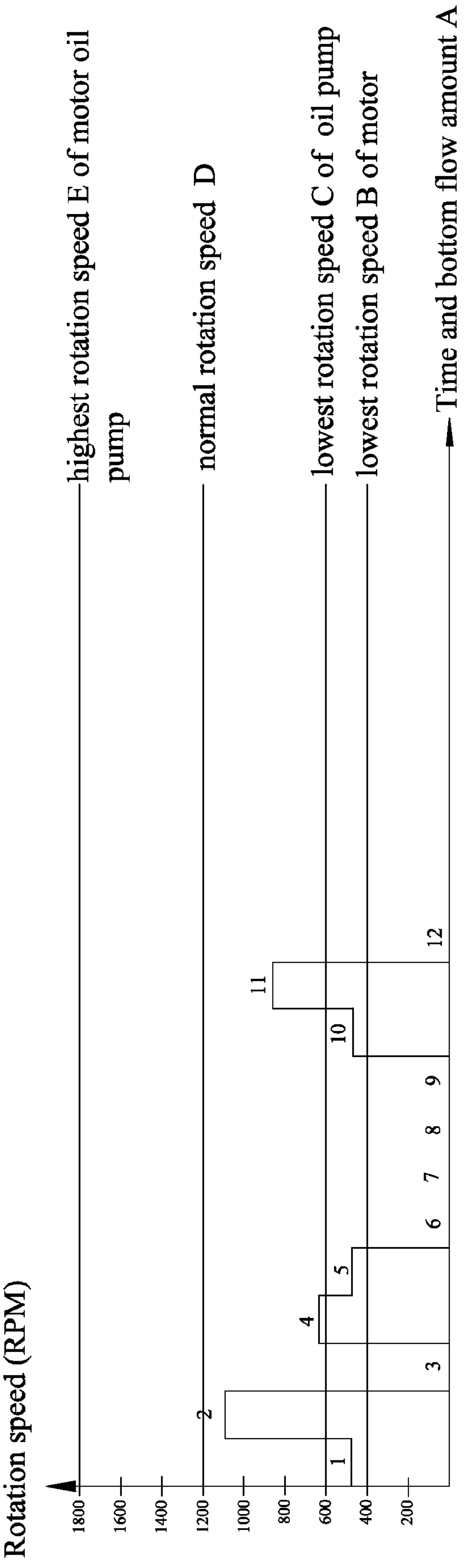
FIG. 12 illustrates rotation speeds of individual elements when applying current invention to different working stages of a Polystyrene product machine.

FIG. 11 illustrates system pressure, flow amounts and coordinated actions of individual elements when applying current invention to a given working condition of a Polystyrene product machine. FIG. 12 illustrates rotation speeds of individual elements when applying current invention to different working stages of a Polystyrene product machine Likewise, the controller of the Polystyrene machine can automatically decide or be commanded by a user to save energy by controlling the frequency converter to reduce speed and hence oil pump out-flow; for instance, at the stage of (2), (4) and (11), since the preset flow amount is greater than the normal outflow of 78 l/m, the speed-increase control plan will be executed, which increase the frequency of the motor speed by increasing the frequency of a frequency converter for oil pump out-flow to reach 85 l/m. At the stage of (1), (3), (5) to (10), and (12), the preset flow amount is lower than that of individual elements (for instance, the oil pump flow amount at lowest rotation speed is 39 l). The controller would then enforce flow increase to 39 l for safe and normal operation.

To sum up, the energy-saving control plan does not have be incorporated with the speed-increase control plan, each can operate independent of each other to satisfy the required needs; what is disclosed simply embodies the basic idea behind the entire invention; adding more variant details or a combination of them to the above disclosure shall not make current invention patentably different.

The invention claimed is:

1. An energy-saving or speed-increase control method for a hydraulic machine including a controller and a plurality of individual elements including one or more motor, oil pump, and frequency converter containing specific characteristics thereof, characterized by the following steps:

I) said specific characteristics of said individual elements are pre-stored in said controller of said hydraulic machine, including restrictions on rotation speeds of said motor and said oil pump, maximum power of said motor in rotation, and output pressure of said frequency converter with a maximum current;

II) a control plan to adjust pressure or flow amount of said hydraulic machine for energy-saving or production efficiency increase;

III) inputting working conditions to said hydraulic machine;

IV) inspection of said working conditions and operational processes of said hydraulic machine;

V) updating demands in said control plan during operation of said hydraulic machine based on V.1) said working conditions inspected and V.2) said operational processes of said hydraulic machine, further restricted by V.3) said specific characteristics of said individual elements pre-stored in said controller.

2. The energy-saving or speed-increase control method as claimed in claim 1, further characterized by:

one or more said control plan for said controller, wherein said control plan is an energy-saving plan to save energy, a speed-increase plan to increase production efficiency, an energy-saving plan to increase production efficiency under a condition of energy-saving, or a speed-increase plan to save energy under a condition of increasing production efficiency.

3. The energy-saving or speed-increase control method as claimed in claim 2, further characterized by:

said working conditions as input to said hydraulic machine refer to preset pressure levels, flow amounts, and other to-be-controlled conditions at different stages of operation of said hydraulic machine;

said working conditions are input to said hydraulic machine prior to any said stages; and said inspection of said working conditions and said operational processes of said hydraulic machine is made during the operation of said hydraulic machine.

4. The energy-saving or speed-increase control method as claimed in claim 3, further characterized by:

said energy-saving plan to save energy aims at reducing adequate flow amount, and coordinating required pressure and flow amount by said hydraulic machine with said specific characteristics of said individual elements thereof;

said speed-increase plan to increase production efficiency aims at increasing an adequate amount to a maximum flow amount value;

said energy-saving plan to increase production efficiency aims at increasing an adequate amount to a maximum flow amount value and simultaneously reducing an adequate amount of pressure; and said speed-increase plan to save energy aims at increasing an adequate amount to a maximum flow amount value at a maximum rotation torque and simultaneously reducing an adequate amount of pressure.

5. The energy-saving or speed-increase control method as claimed in claim 3, further characterized by:

said specific characteristics of said individual elements of said hydraulic machine is preset and incorporated into said energy-saving plan to save energy, into said speed-increase plan to increase production efficiency, into said energy-saving plan to increase production efficiency, or into said speed-increase plan to save energy, in coordination with said working conditions and said operational processes of said hydraulic machine, stored in said controller; executed either by said controller or by a user's manual input, with values of parameters be re-written by the user's manual input.

6. The energy-saving or speed-increase control method as claimed in claim 5, wherein said individual elements of said hydraulic machine include engines, energy suppliers for said engines, working valves for controlling operation, control valves for pressure, control valves for flow amounts, pipe circuits of said machine, oil filter nets, cooler, stopping valves, and temperature control elements.

7. The energy-saving or speed-increase control method as claimed in claim 6, further characterized by:

said engines and said energy suppliers for said engines use alternating currents, and said energy suppliers for said engines are frequency converters.

* * * * *